(12) United States Patent
Aoyama

(10) Patent No.: US 7,844,395 B2
(45) Date of Patent: Nov. 30, 2010

(54) MAP DISPLAY HAVING SCALING FACTORS ON THE DISPLAY AND SELECTING SCALING FACTORS BY TOUCH SENSE

(75) Inventor: Noriaki Aoyama, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 1096 days.

(21) Appl. No.: 11/348,247

(22) Filed: Feb. 7, 2006

(65) Prior Publication Data
US 2006/0178827 A1   Aug. 10, 2006

(30) Foreign Application Priority Data
Feb. 10, 2005   (JP)   ............... 2005-033897

(51) Int. Cl.
*G01C 21/32* (2006.01)
(52) U.S. Cl. ............... 701/212; 701/211; 340/988; 340/990; 340/995.1; 340/995.11; 340/995.14; 340/995.15; 340/995.16; 340/995.17
(58) Field of Classification Search ............... 701/211, 701/212, 200, 208, 213; 340/995.1, 988, 340/990, 998.1, 995.11, 995.14–995.17; 345/169, 173, 418, 423, 661, 667; 348/14.03, 348/14.07; 715/700, 788, 804
See application file for complete search history.

(56) References Cited

U.S. PATENT DOCUMENTS

| | | | |
|---|---|---|---|
| 5,040,131 A | | 8/1991 | Torres |
| 5,398,188 A | * | 3/1995 | Maruyama ............... 701/208 |
| 5,731,979 A | * | 3/1998 | Yano et al. ............... 701/211 |
| 5,948,040 A | * | 9/1999 | DeLorme et al. ............... 701/201 |
| 6,006,161 A | * | 12/1999 | Katou ............... 701/212 |
| 6,028,603 A | | 2/2000 | Wang et al. |
| 6,067,502 A | * | 5/2000 | Hayashida et al. ............... 701/209 |
| 6,456,938 B1 | * | 9/2002 | Barnard ............... 701/213 |

(Continued)

FOREIGN PATENT DOCUMENTS

JP   8-201071 A   8/1996

(Continued)

OTHER PUBLICATIONS

German Office Action dated May 5, 2008 w/English translation (seven (7) pages).

*Primary Examiner*—Thomas G Black
*Assistant Examiner*—Sze-Hon Kong
(74) *Attorney, Agent, or Firm*—Crowell & Moring LLP

(57) ABSTRACT

A map display apparatus that displays a map includes: a display device; a touch panel disposed over a screen at the display device; and a control device that controls display at the display device with a signal input from the touch panel, and: the control device displays at the display device a map and a plurality of buttons used to adjust a scaling factor of the map, makes a decision as to whether or not the touch panel has been pressed at a position corresponding to one of the plurality of buttons, makes a decision as to whether or not a finger having pressed the touch panel has been moved to a specific position and displays, together with the map, a wide-area map at a scaling factor smaller than the scaling factor of the map if the finger having pressed the touch panel is judged to have been moved to the specific position.

8 Claims, 10 Drawing Sheets

U.S. PATENT DOCUMENTS

| | | | |
|---|---|---|---|
| 6,868,336 B1* | 3/2005 | Nakano | 701/208 |
| 7,002,553 B2* | 2/2006 | Shkolnikov | 345/169 |
| 7,221,358 B2* | 5/2007 | Sasaki | 345/173 |
| 7,392,133 B2* | 6/2008 | Maruyama et al. | 701/208 |
| 7,551,187 B2* | 6/2009 | Agrawala et al. | 345/667 |
| 7,555,725 B2* | 6/2009 | Abramson et al. | 715/781 |
| 2001/0035880 A1* | 11/2001 | Musatov et al. | 345/764 |
| 2002/0015064 A1* | 2/2002 | Robotham et al. | 345/863 |
| 2002/0177944 A1* | 11/2002 | Ihara et al. | 701/208 |
| 2003/0182052 A1* | 9/2003 | DeLorme et al. | 701/201 |
| 2004/0098195 A1* | 5/2004 | Listle et al. | 701/211 |
| 2004/0186662 A1* | 9/2004 | Morie | 701/208 |
| 2005/0138575 A1* | 6/2005 | Hashimoto et al. | 715/815 |
| 2005/0188326 A1* | 8/2005 | Ikeda | 715/788 |
| 2005/0188329 A1* | 8/2005 | Cutler et al. | 715/804 |
| 2006/0025920 A1* | 2/2006 | Nezu et al. | 701/200 |
| 2006/0116578 A1* | 6/2006 | Grunwald et al. | 600/440 |
| 2008/0100591 A1* | 5/2008 | Nezu et al. | 345/173 |
| 2008/0204476 A1* | 8/2008 | Montague | 345/661 |
| 2009/0113478 A1* | 4/2009 | Haughawout et al. | 725/40 |
| 2009/0259935 A1* | 10/2009 | Kramer et al. | 715/234 |

FOREIGN PATENT DOCUMENTS

| | | |
|---|---|---|
| JP | 10-141974 A | 5/1998 |
| JP | 2002-304256 A | 10/2002 |
| JP | 2002-328040 A | 11/2002 |
| JP | 2003-186392 A | 7/2003 |
| JP | 2003-323258 A | 11/2003 |
| JP | 2004-28678 A | 1/2004 |

* cited by examiner

MAP DISPLAY HAVING SCALING FACTORS ON THE DISPLAY AND SELECTING SCALING FACTORS BY TOUCH SENSE

INCORPORATION BY REFERENCE

The disclosure of the following priority application is herein incorporated by reference:
Japanese Patent Application No. 2005-033897 filed Feb. 10, 2005

BACKGROUND OF THE INVENTION

1. Field of the Invention

The present invention relates to a map display apparatus, a map display method and a navigation system that may be adopted to display a map on a display device.

2. Description of Related Art

There is a map display apparatus known in the related art on which a wide-area map is displayed in a split screen as the map screen currently on display is scrolled (see Japanese Laid Open Patent Publication No. 2003-186392).

SUMMARY OF THE INVENTION

At the map display apparatus disclosed in Japanese Laid Open Patent Publication No. 2003-186392, the wide-area map is brought up on display in the split screen with predetermined timing at a predetermined scaling factor. This means that the user is not allowed to bring up a split screen display of the wide-area map with the timing of his choice or to select a desired scaling factor for the wide-area map display.

According to the 1st aspect of the invention, a map display apparatus that displays a map, comprises: a display device; a touch panel disposed over a screen at the display device; and a control device that controls display at the display device with a signal input from the touch panel, and: the control device displays at the display device a map and a plurality of buttons used to adjust a scaling factor of the map, makes a decision as to whether or not the touch panel has been pressed at a position corresponding to one of the plurality of buttons, makes a decision as to whether or not a finger having pressed the touch panel has been moved to a specific position and displays, together with the map, a wide-area map at a scaling factor smaller than the scaling factor of the map if the finger having pressed the touch panel is judged to have been moved to the specific position.

According to the 2nd aspect of the invention, in the map display apparatus according to the 1st aspect, it is preferred that: the specific position is a position corresponding to a display position of the map; and upon deciding that the finger having pressed the touch panel has been moved to the position corresponding to the display position of the map, the control device displays the wide-area map over a part of an area where the map is displayed.

According to the 3rd aspect of the invention, in the map display apparatus according to the 1st aspect, it is preferred that: the control device displays the plurality of buttons on either side of an area where the map is displayed; and upon deciding that the finger having pressed the touch panel has been moved to a position corresponding to a display area where the map is displayed and then has been lifted, the control device displays the wide-area map over a part of the map on display.

According to the 4th aspect of the invention, in the map display apparatus according to any of the 1st through 3rd aspects, it is preferred that the control device displays the wide-area map at a scaling factor designated to one of the buttons initially pressed by the finger.

According to the 5th aspect of the invention, in the map display apparatus according to any of the 1st through 4th aspects, it is preferred that the control device sustains the scaling factor for the map unchanged after the wide-area map is displayed.

According to the 6th aspect of the invention, in the map display apparatus according to any of the 1st through 5th aspects, it is preferred that the control device brings up the wide-area map as a semitransparent display.

According to the 7th aspect of the invention, in the map display apparatus according to any of the 1st through 6th aspects, it is preferred that upon deciding that one of the buttons has been pressed over a predetermined length of time or longer or that one of the buttons has been pressed twice or more in succession, the control device displays the map by adjusting the scaling factor for the map to the scaling factor designated to the pressed button.

According to the 8th aspect of the invention, in the map display apparatus according to any of the 1st through 7th aspects, it is preferred that: the control device displays the plurality of buttons over two rows running along one side of an area where the map is displayed; and upon deciding that a position at the touch panel corresponding to a button disposed in an outer row has been pressed, the control device invalidates a signal generated in response to pressing a position at the touch panel corresponding to, at least, a button disposed in an inner row.

According to the 9th aspect of the invention, in the map display apparatus according to any of the 1st through 8th aspects, it is preferred that upon deciding that a position at the touch panel corresponding to a given point in the wide-area map has been pressed, the control device switches the displayed map to a map of an area around the point on the wide-area map having been pressed without altering the scaling factor.

According to the 10th aspect of the invention, a navigation system comprises a map display apparatus according to any of the 1st through 9th aspects.

According to the 11th aspect of the invention, a map display method for displaying a map at a display device that includes a touch panel disposed over a screen thereof, comprises: displaying a map and a plurality of buttons used to adjust a scaling factor of the map; making a decision as to whether or not a position on the touch panel corresponding to one of the plurality of buttons has been pressed and a finger having pressed the position on the touch panel has been moved to a specific position; and displaying a wide-area map at a scaling factor smaller than a scaling factor of the map upon deciding that the finger having pressed the position on the touch panel has been moved to the specific position.

The display device described above may be referred to as a display means, the touch panel may be referred to as a touch panel means and the control device may be referred to as a control means instead.

BRIEF DESCRIPTION OF PREFERRED EMBODIMENTS

Figure 1:
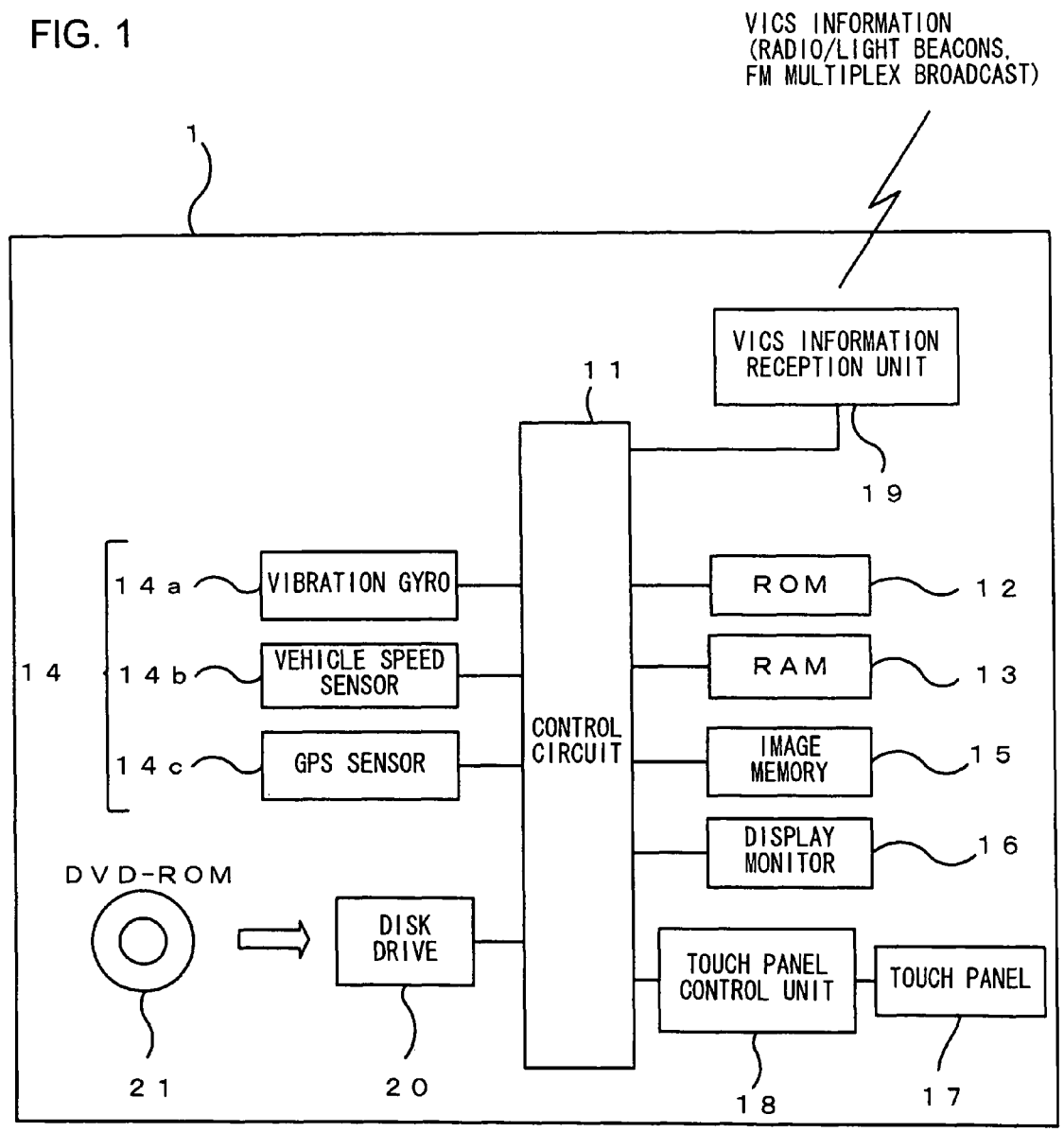
FIG. 1 is a block diagram showing the structure adopted in the navigation system according to the present invention.

FIG. 1 shows the structure adopted in the navigation system achieved in an embodiment of the present invention. In the navigation system 1 in FIG. 1, which is installed in a vehicle, normal navigation functions including map display are engaged in response to input operations at a touch panel. The navigation system 1 includes a control circuit 11, a ROM 12, a RAM 13, a current position detection device 14, an image memory 15, a display monitor 16, a touch panel 17, a VICS (Vehicle Information and Communication System) information reception unit 19 and a disk drive 20.

The touch panel 17 is a transparent touch switch laminated over the surface of the display monitor 16. In this specification, a description "an image is displayed at the touch panel 17" is used for an image displayed at the display monitor 16. A touch panel control unit 18, which determines through calculation a position at which the touch panel 17 has been depressed based upon a signal from the touch panel 17, is connected to the touch panel 17.

A DVD-ROM 21 having map data recorded therein is loaded in the disk drive 20. The map data include map display data, route search data and the like. As the map display data, map data at a plurality of scaling factors, from wide area to highly detailed, are provided, and the scaling factor of the map on display can be switched in response to a request from the user.

The control circuit 11, constituted with a microprocessor and its peripheral circuits, executes various types of control as it executes a control program stored in the ROM 12 by using the RAM 13 as a work area. The results of a specific type of route search processing executed by the control circuit 11 based upon the map data stored in the DVD-ROM 21 are displayed as a recommended route at the display monitor 16.

The current position detection device 14, which detects the current position of the vehicle, may be constituted with a vibration gyro 14a that detects the advancing azimuth of the vehicle, a vehicle speed sensor 14b that detects the vehicle speed, a GPS sensor 14c that detects a GPS signal transmitted from a GPS (global positioning system) satellite. Based upon the current position of the vehicle detected by the current position detection device 14, the navigation system 1 determines the map display range, the route search start point and the like and also indicates the current position on the map.

In the image memory 15, image data to be displayed at the display monitor 16 are stored. These image data, which include road map drawing data and various types of graphic data, are generated as necessary based upon the map data stored in the DVD ROM 21 read by the disk drive 20. The navigation system 1 is able to bring up map display and the like by using the image data thus generated.

Various types of information such as a road map of an area around the subject vehicle position are provided to the user of the navigation system 1 as screen display at the display monitor 16 based upon various types of information including the map data. As explained earlier, the touch panel 17 is a transparent panel disposed on the monitor screen at the display monitor 16, and the display on the display monitor 16 is viewed through the touch panel 17.

The touch panel 17 has an input function, and as the map screen, any of various buttons, a display menu or the like on display at the touch panel 17 is depressed with a finger, the touch panel control unit 18 determines the depressed position through calculation. The calculated depressed position is input to the control circuit 11, which then sets a destination or executes functions corresponding to the button or the display menu having been depressed. For instance, if a scroll button displayed at the touch panel 17 is depressed, a display of a map screen, a selection menu or the like can be scrolled.

As the user sets a destination, the navigation system 1 executes an arithmetic operation based upon a specific algorithm to determine a route to the destination from a start point set at the current position detected by the GPS sensor 14c. The route thus determined (hereafter referred to as a "searched route") is indicated in the screen in a manner distinguishable from other roads by adopting a different display mode, e.g., by using a different display color or the like. As a result, the user is easily able to identify the searched route on the map in the screen. In addition, the navigation system 1 guides the vehicle along the searched route by providing visual instructions on the screen, audio instructions or the like to the user as the vehicle advances.

The VICS information reception unit 19 receives VICS information such as traffic jam information provided by a VICS information center (not shown) and outputs the received information to the control circuit 11. The VICS information is transmitted via radio beacons primarily installed on express highways, light beacons primarily installed on regular roads and FM multiplex broadcast stations. The VICS information having been transmitted via any of these means is received at the VICS information reception unit 19 of the navigation system 1.

The disk drive 20 reads out map data to be used to display a map at the display monitor 16 from the DVD ROM 21 loaded therein. It is to be noted that the map data may be read out from a recording medium other than a DVD ROM, such as a CD-ROM or a hard disk.

Next, the map display method adopted in the embodiment of the present invention and the corresponding operations of the navigation system by the user are explained in reference to FIGS. 2 through 6.

Figure 2:
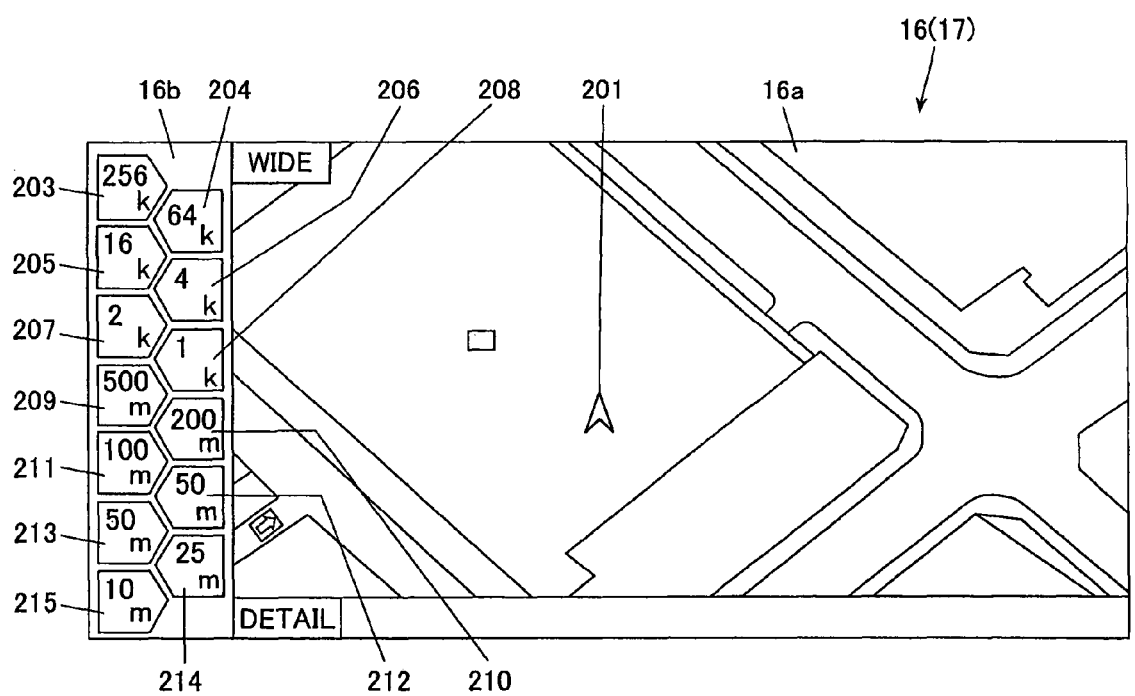
FIG. 2 shows a regular display screen of the navigation system while the user is traveling in the vehicle.
Figure 3:
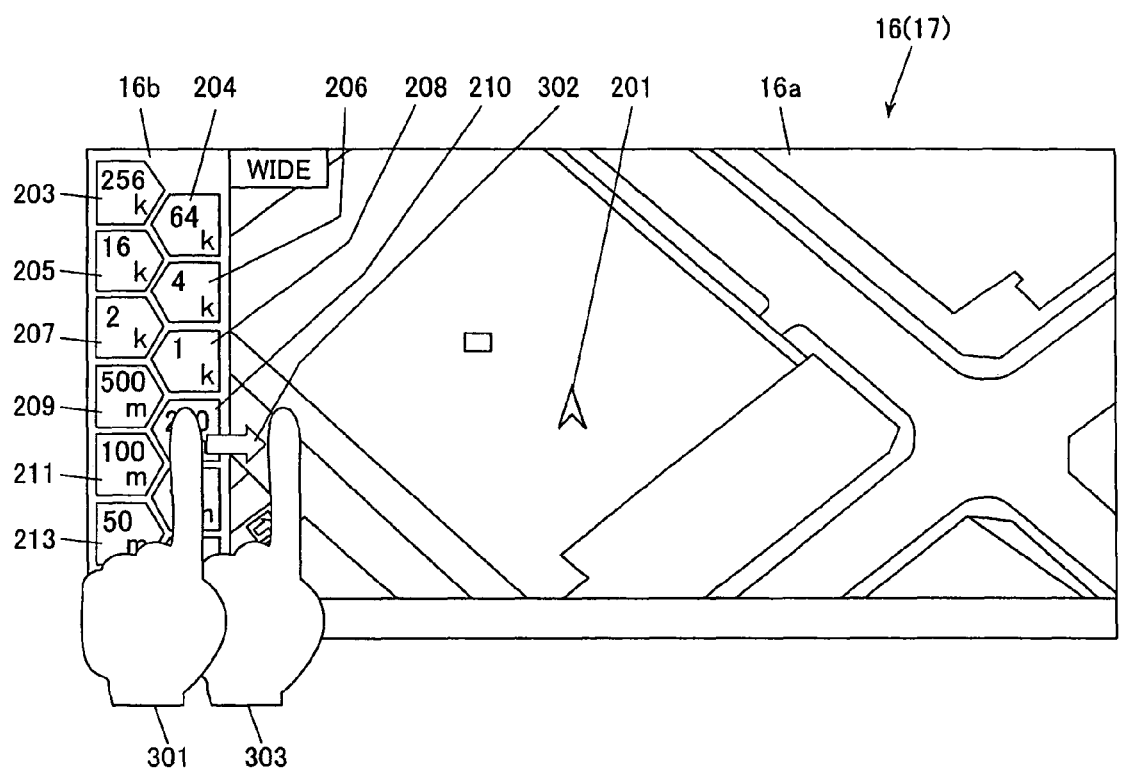
FIG. 3 illustrates the operation performed to display a wide-area map within the main map display range.

FIG. 2 shows the display screen which is up while the vehicle is traveling. Under normal circumstances, a map indicating a subject vehicle position 201 at the center of the map screen is displayed in a map display area 16a. In the description provided in this specification, the map displayed in the map display area 16a is referred to as a "main map". In addition, scale buttons 203 through 215 are displayed in a display area 16b set adjacent to the map display area 16a. It is to be noted that the scale buttons 203 through 215 may instead be referred to as scale bars 203 through 215. Alternatively, the entire array of the scale buttons 203 through 215 may be collectively referred to as a scale bar.

The scale buttons 203 through 215 are disposed over two rows within the display area 16b along the left side of the touch panel 17. The scale buttons 203 through 215, corresponding to a plurality of scaling factors, are each depressed to select a specific scaling factor for the main map displayed in the map display area 16a. As one of the scale buttons 203 through 215 is held down with a finger for a predetermined length of time, e.g., 0.5 sec, the map scaling factor is switched and the map is displayed at a new scaling factor. For instance, if the scale button 215 is held down over the predetermined length of time, the main map is displayed at the scaling factor at which the width of the map on display represents a real-world distance of 10 m, as indicated at the scale buttons 215. By selecting a specific scale button among the scale buttons 203 through 215 and pressing it down as described above, the desired scaling factor for the main map can be selected.

Next, the procedure through which a wide-area map of a wider area compared to the main map currently on display is brought up on display in a split screen within the map display area 16a is explained. The following explanation, given in reference to FIG. 3, focuses on an example in which a wide-area map is displayed in the split screen at a scaling factor corresponding to a real-world distance of 200 m as the lateral range.

Figure 4:
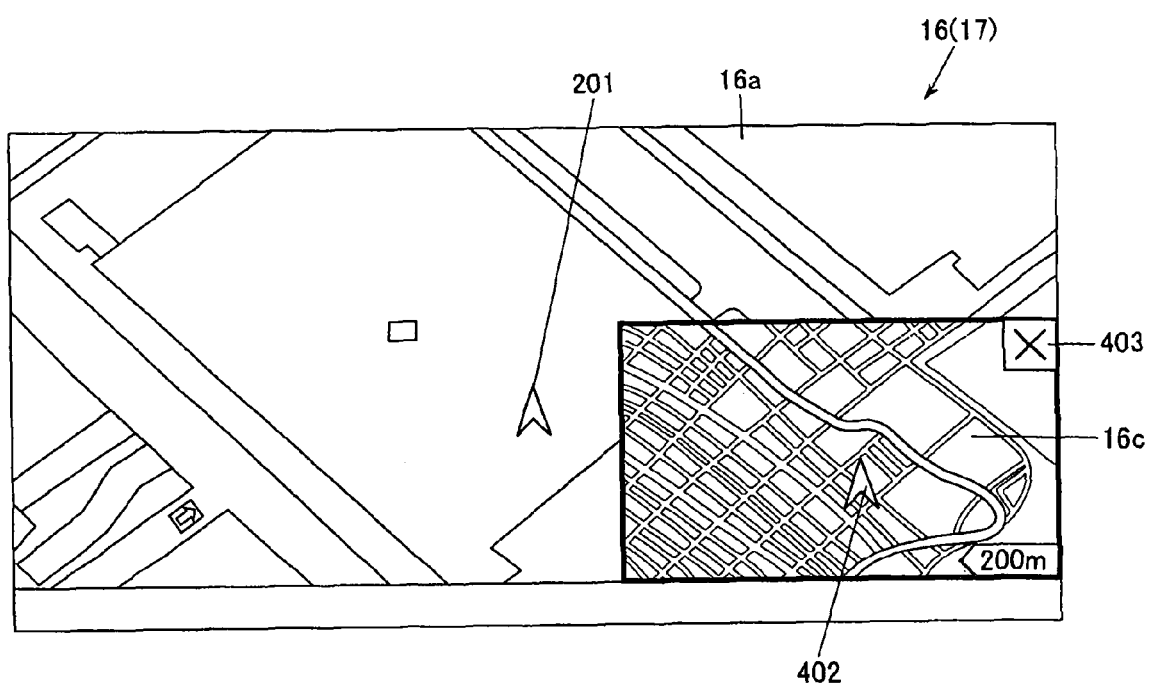
FIG. 4 shows the display screen at the touch panel containing the wide-area map displayed in a split screen within the main map display range.

First, the user presses down the scale button 210 with a finger 301, and before a predetermined length of time elapses, he drags the finger, as indicated by the reference numeral 303, to the map display area 16a as indicated by reference numeral 302 while the finger 301 is still touching the touch panel 17. As the finger 303 moves to a given position in the map display area 16a, the user lifts his finger 303 off the touch panel. As a result, a wide-area map is brought up on display in a split screen area 16c at the lower right in the map display area 16a, as shown in FIG. 4.

Namely, the wide-area map is displayed in the split screen area 16c superimposed over part of the main map displayed in the map display area 16a. The wide-area map is displayed at the scaling factor corresponding to a real-world distance of 200 m as the lateral range of the split screen area 16c. In other words, the scaling factor for the wide-area map displayed in the split screen area 16c is selected in correspondence to the scale button first depressed with the finger 301 among the scale buttons 203 through 215.

The term "wide area map" in this context refers to a map at a smaller scaling factor than that of the map in the map display area 16a, which contains the range of the map displayed in the map display area 16a. The scaling factor of a wider-area map indicates a smaller value, e.g., 1/1000, 1/10,000 or 1/100,000. The wide-area map is displayed without altering the scaling factor of the main map on display in the map display area 16a. In addition, as the wide-area map is brought up on display in the split screen area 16c, the display of the scale buttons 203 through 215 is cleared and the subject vehicle position 402 is also indicated in the wide area map. The wide-area map is brought up as a semitransparent display, with roads, landmarks and the like in the map display area 16a displayed with lower density in the split screen area 16c. A display clear mark 403 is displayed at an upper right position in the split screen area 16c, and as the display clear mark 403 is depressed, the entire split screen area 16c is cleared. When the split screen area 16c is cleared, the scale buttons 203 through 215 in FIG. 2 are brought back on display.

Figure 5:
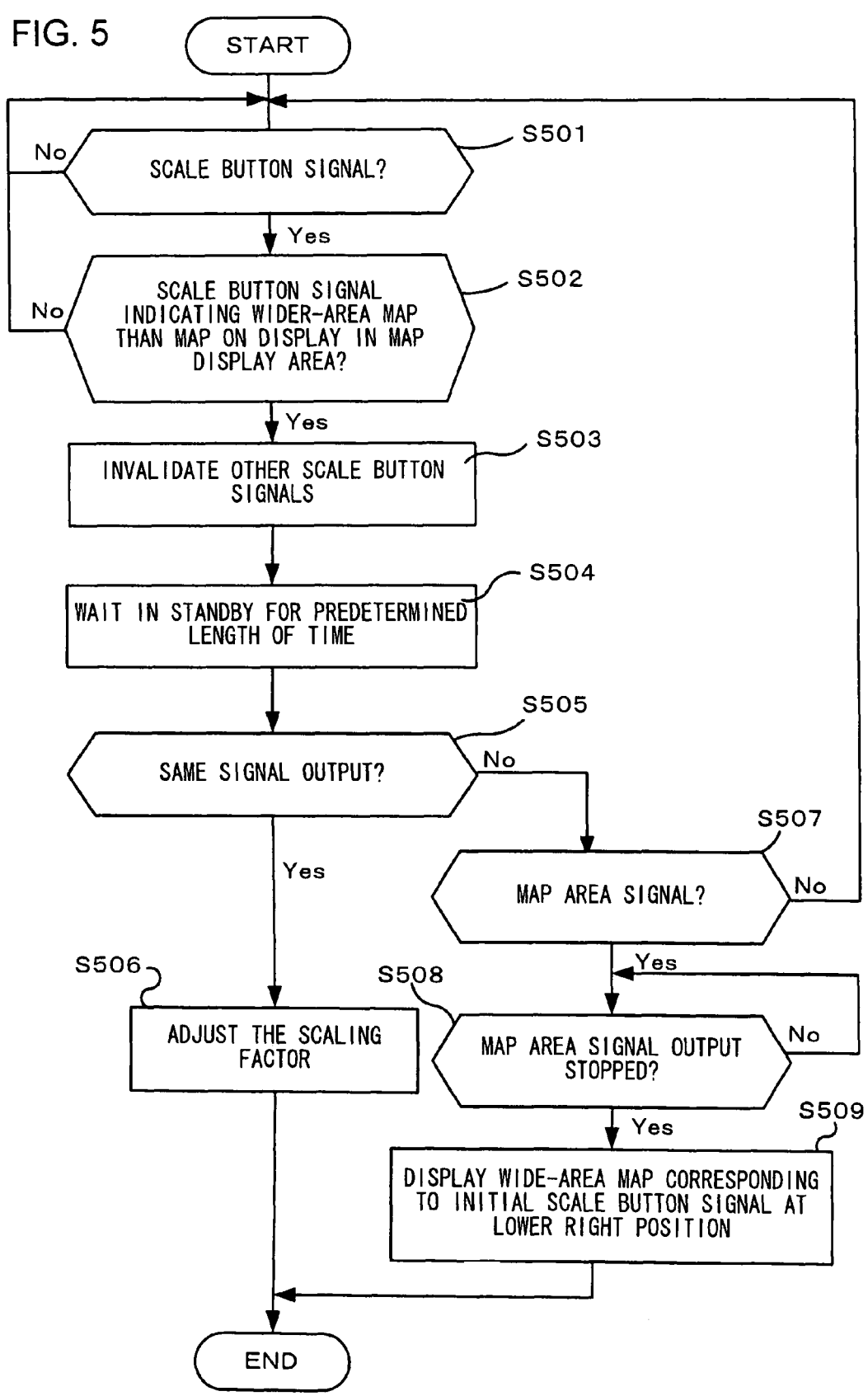
FIG. 5 presents a flowchart of the processing executed in the control circuit to display a wide-area map within the main map display range.

Next, the procedure of the processing executed to bring up the split display of the wide-area map within the map display area 16a is explained in reference to the flowchart presented in FIG. 5. This processing is executed by the control circuit 11 in conformance to a program.

In step S501, a decision is made as to whether or not a signal output from the touch panel control unit 18 is a signal (a scale button signal) generated in response to a depression of any of the scale buttons 203 through 215. If it is decided that the signal is not a scale button signal, the operation returns to step S501. If it is decided that the signal is a scale button signal, the operation proceeds to step S502 to make a decision as to whether or not the scale button signal has been generated in response to a depression of a scale button among the scale buttons 203 through 215 indicating a distance greater than the distance corresponding to the lateral dimension of the main map, i.e., whether or not the scale button signal has been generated in response to a depression of a scale button among the scale buttons 203 through 215 for display of a map over a wider area than the main map.

If an affirmative decision is made in step S502, the operation proceeds to step S503, whereas the operation returns to step S501 if a negative decision is made. A decision as to whether or not the scale button signal has been generated by pressing down a scale button among the scale buttons 203 through 215 indicating a greater distance than the distance corresponding to the lateral dimension of the main map is made as described above, since another map, i.e., the wide area map, is brought up on display to help the user accurately identify the area shown in the main map with greater ease.

If another scale button signal different from the scale button signal having been detected in step S501 has also been output from the touch panel control unit 18, the other scale button signal is invalidated in step S503. Through this processing, the initial scale button signal alone is validated even if another scale button among the scale buttons 203 through 215 has been depressed while the finger having depressed the desired scale button among the scale buttons 203 through 215 is moved or dragged.

In step S504, the operation waits in standby over a predetermined length of time, e.g., 0.5 sec. Then, in step S505, the scale button signal is read from the touch panel control unit 18 and a decision is made as to whether or not the same scale button as the scale button having been detected in step S501 has been read. If it is decided that the same signal has been read, it is judged that one of the scale buttons 203 through 215 has been held down over the predetermined length of time and the operation proceeds to step S506.

In step S506, the scaling factor of the main map in the map display area 16a is adjusted to the scaling factor at which the measure indicated at the depressed scale button among the scale buttons 203 through 215 corresponds to the real-world lateral distance covered by the main map. If it is decided that the signal is not the same signal, the depressed position is judged to have been moved while being depressed and, in this case, the operation proceeds to step S507. Then, a decision is made as to whether or not a signal generated in response to a depression at the map display area 16a, i.e., a map area signal, has been output from the touch panel control unit 18. If it is decided that a map area signal has not been output, the operation returns to step S501, whereas if it is decided that a map area signal has been output, the operation proceeds to step S508.

In step S508, a decision is made as to whether or not the output of the map area signal from the touch panel control unit 18 has stopped. The operation remains in step S508 if it is decided that the output of the map area signal has not stopped, whereas the operation proceeds to step S509 upon judging that the finger having pressed on the map display area 16a has been lifted from the touch panel 17 if the signal output has stopped. In step S509, a wide-area map is displayed in the split screen area 16c at the scaling factor corresponding to the scale button signal having been detected in step S501.

As the finger having depressed one of the scale buttons 203 through 215 and moved or dragged over to the map display area 16a is lifted from the touch panel as described above, the wide-area map is brought up on display in the split screen area 16c in the right corner within the map display area 16a.

Next, the scale button signal with regard to which a decision is made in step S501 and the map area signal with regard to which a decision is made in step S507 in the flowchart presented in FIG. 5 are explained.

Figure 6:
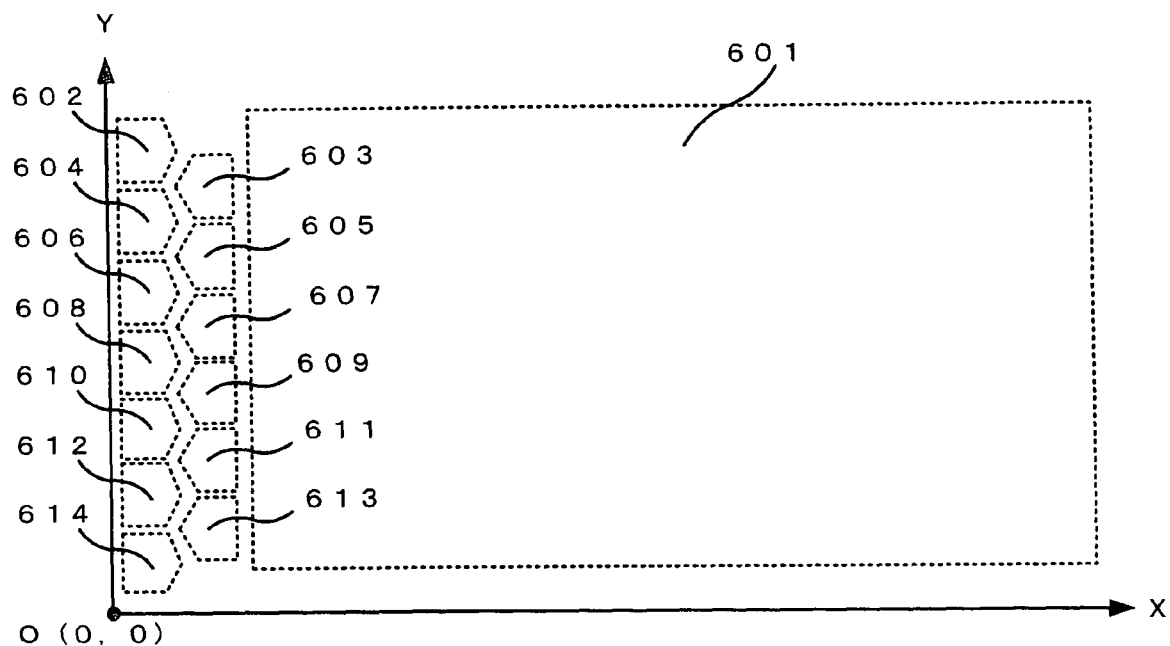
FIG. 6 shows touch areas set at the touch panel.

In the embodiment, touch areas 601 and 602 through 614 are set at the touch panel 17, as shown in FIG. 6, so as to enable decision-making as to whether or not one of the scale buttons 203 through 215 has been depressed and whether or not the map display area 16a has been depressed. The position that is depressed within the touch area 601 is judged to be the position within the map display area 16a, and a position signal generated within the touch area 601 constitutes a map area signal. The touch areas 602 through 614 are set so as to enable decision-making that a position corresponding to the display position of any of the scale buttons 203 through 215 has been depressed. Position signals generated in the touch areas 602 through 614 each constitute a scale button signal.

If a map area signal is output from the touch panel control unit 18, the control circuit 11 judges that the map display area 16a has been depressed, whereas if a scale button signal is output from the touch panel control unit 18, the control circuit 11 judges that one of the scale buttons 203 through 215 has been depressed.

Figure 7:
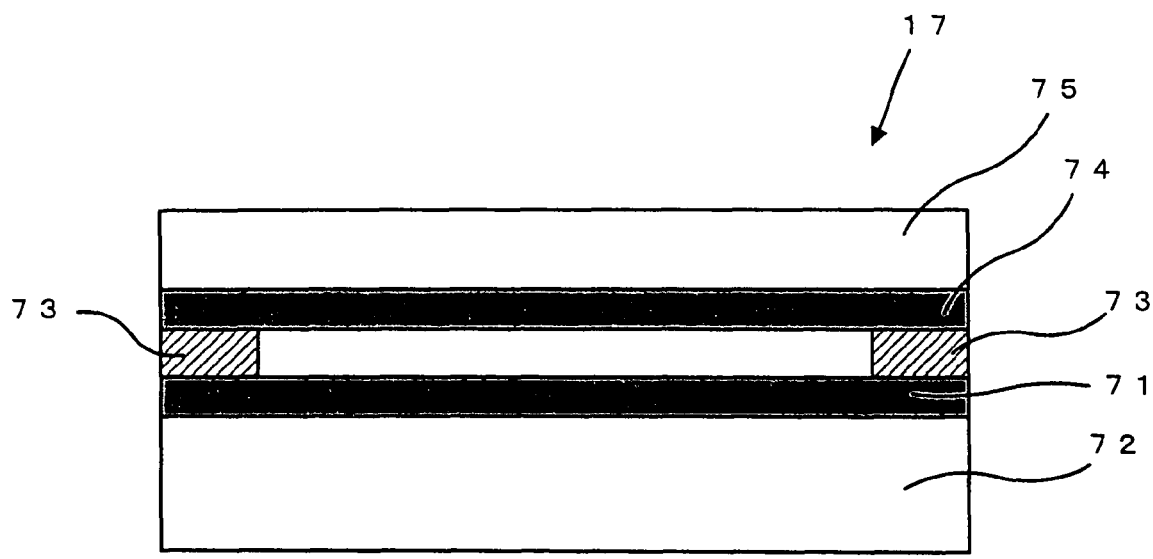
FIG. 7 shows a section of the touch panel.

Now, various signals provided via the touch panel control unit 18 are explained. The principle of the touch panel is first explained in reference to FIG. 7. FIG. 7 shows a sectional view of the touch panel 17, which is constituted with a glass substrate 72 having formed thereupon a transparent electrically conductive film 71 such as an ITO (indium tin oxide) film, and a PET (polyethylene terephthalate) film 75 having formed thereupon a transparent conductive film 74 such as an ITO film, which is pasted onto the transparent conductive film at the glass substrate 72 via a spacer 73. As the surface of the PET film 75, which is flexible, is depressed, the transparent conductive film 71 formed at the glass substrate 72 and the transparent conductive film 74 formed at the PET film 75 become shorted at the depressed position.

Figure 8:
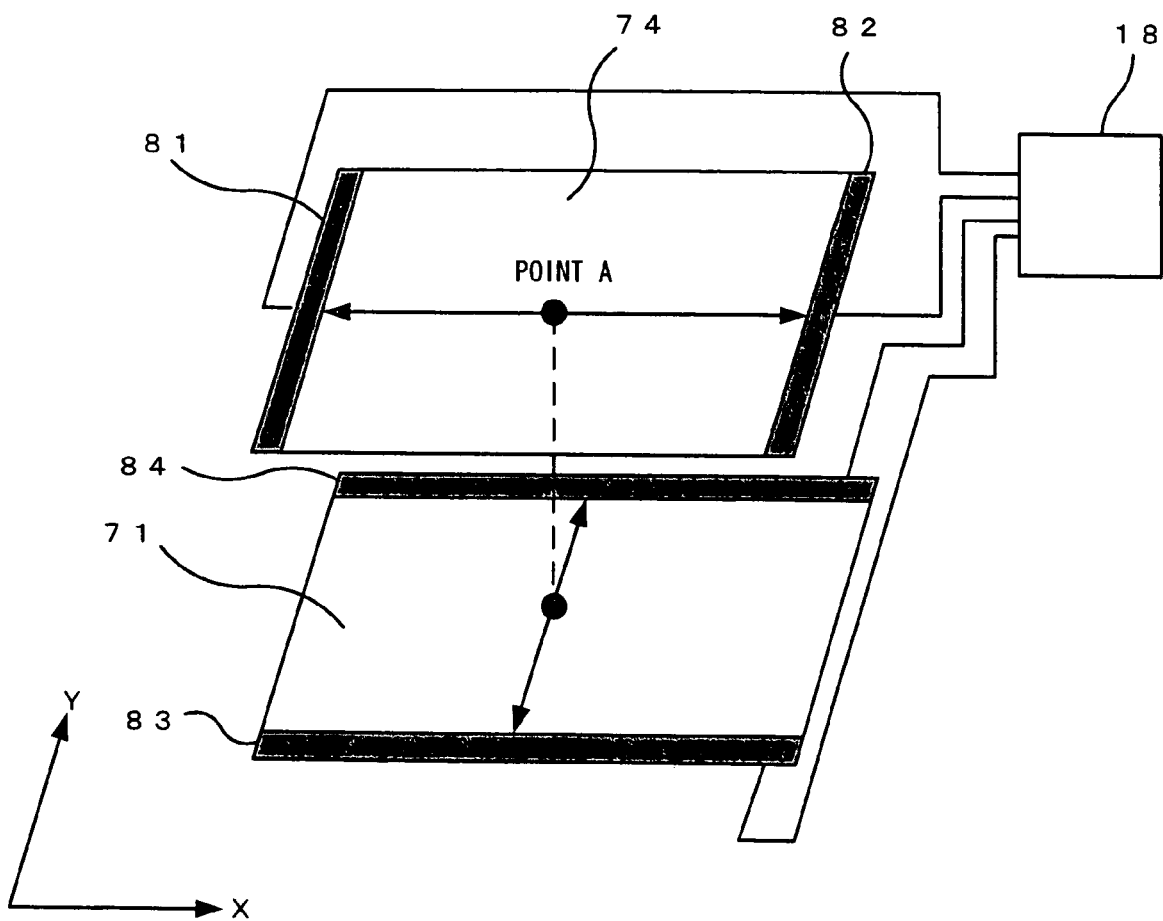
FIG. 8 illustrates how a signal corresponding to the depressed position on the touch panel is output.

Next, the principle of the output of a signal indicating the depressed position from the touch panel control unit 18 is explained in reference to FIG. 8. Point A in FIG. 8 indicates the position at which the touch panel has been depressed and shorting has occurred. X-axis electrodes 81 and 82 are formed at the transparent conductive film 74 formed at the PET film 75. Y-axis electrodes 83 and 84 are formed at the transparent conductive film 71 formed at the glass substrate 72. The X-axis electrodes 81 and 82 and the Y-axis electrodes 83 and 84 are all connected to the touch panel control unit 18.

When the touch panel has been depressed at position A, the transparent conductive films 71 and 74 become shorted and, accordingly, if a voltage is applied to the X axis electrodes 81 and 82, a voltage is detected at the Y axis electrodes 83 and 84. Based upon the value of the detected voltage, the X coordinate of the depressed position is calculated by the touch panel control unit 18. As a voltage is applied to the Y axis electrodes 83 and 84, a voltage is likewise detected at the X axis electrodes 81 and 82. Based upon the value of the detected voltage, the touch panel control unit 18 calculates the Y coordinate of the depressed position.

Through the process described above, the positional coordinates (X, Y) of the depressed position A are calculated by alternately applying a voltage to the X axis electrodes 81 and 82 and the Y axis electrodes 83 and 84. The depressed position A thus calculated is then output as a position signal to the control circuit 11 from the touch panel control unit 18.

If this position signal is judged to indicate a position within the touch area 601, the control circuit 11 identifies it as a map area signal, whereas if it is judged to indicate a position in one of the touch areas 602 through 613, the control circuit 11 identifies it as a scale button signal.

The following advantages are achieved with the navigation system in the embodiment described above.

(1) A wide-area map is brought up on display simply by pressing down on one of the scale buttons 203 through 215 displayed at the touch panel 17 and moving (dragging) the finger having depressed the scale button. As a result, the user is easily able to display the wide-area map at any time and thus, better convenience for the user is assured.

(2) The process of depressing one of the scale buttons 203 through 215 on display at the touch panel 17 and then moving or dragging the finger having depressed the button over to the map display area 16a can be easily regarded as an operation for moving a wide-area map from a scale button 203 through 215 over to the map display area 16a. Thus, the user is able to display the wide-area map through an intuitive operation.

(3) The wide-area map is brought up on display as a depression on the touch panel 17 stops in the map display area 16a. This means that even if the finger having pressed one of the scale buttons 203 through 215 to adjust the scaling factor of the map displayed in the map display area 16a moves slightly afterwards, no wide area map is brought up on display. Thus, unnecessary wide-area map display is prevented.

(4) A wide-area map at a specific scaling factor can be brought up on display by using the scale buttons 203 through 215 operated to adjust the map scaling factor. In other words, depending upon the manner with which the scale buttons 203 through 215 displayed at the touch panel 17 are depressed, i.e., depending upon whether a scale button is held down over the predetermined length of time or a finger having depressed a scale button is then moved or dragged, each button can be used either to adjust the scaling factor of the main map or to bring up a wide-area map at a specific scaling factor in a split screen (double screen display), i.e., two different functions are achieved in correspondence to each button. Thus, it is not necessary to provide special buttons for displaying a wide-area map in a split screen or for setting a specific scaling factor for the wide-area map to be displayed in the split screen area 16c. Since this structure keeps down the number of buttons that need to be displayed at the touch panel, a simpler touch panel display is achieved, which, in turn, enables the user to operate the navigation system with a higher level of safety.

(5) Since the map scaling factor designated in correspondence to the scale button depressed first among the scale buttons 203 through 215 is selected, the wide-area map can be displayed at the scaling factor desired by the user, thereby assuring better convenience for the user.

(6) Even after the wide-area map is brought up on display in the split screen area 16c, the scaling factor of the map in the map display area 16a remains unchanged. As a result, after the wide-area map is brought up on display, the user is still able to view the same main map in the map display area 16a without experiencing any operational disorientation.

(7) As one of the scale buttons 203, 205, 207, 209, 211, 213 and 215 disposed on the outer row of the touch panel 17 is depressed and the finger having pressed the scale button is moved or dragged to the map display area 16a for the main map, a scale button among the scale buttons 204, 206, 208, 210, 212 and 214 disposed on the inner row of the touch panel 17 will be depressed as well. However, any signal generated in correspondence to the scale button 204, 206, 208, 210, 212 or 214 in this situation will be invalidated so as to ensure that the scaling factor of the wide-area map is correctly set to the scaling factor desired by the user.

(8) Since the wide-area map is brought up as a semitransparent display in the split screen area 16c, the sense of crowding that the user may experience with the wide-area map superimposed over the main map is averted.

Next, the navigation system achieved in another embodiment of the present invention is explained. As any position on the wide-area map displayed within the split screen area 16c is depressed, a main map around the depressed position is brought up on display in the map display area 16a in this navigation system. The scaling factor of the map brought up on display in the map display area 16a at this time is the initial map scaling factor set in correspondence to the map display area 16a.

Figure 9:
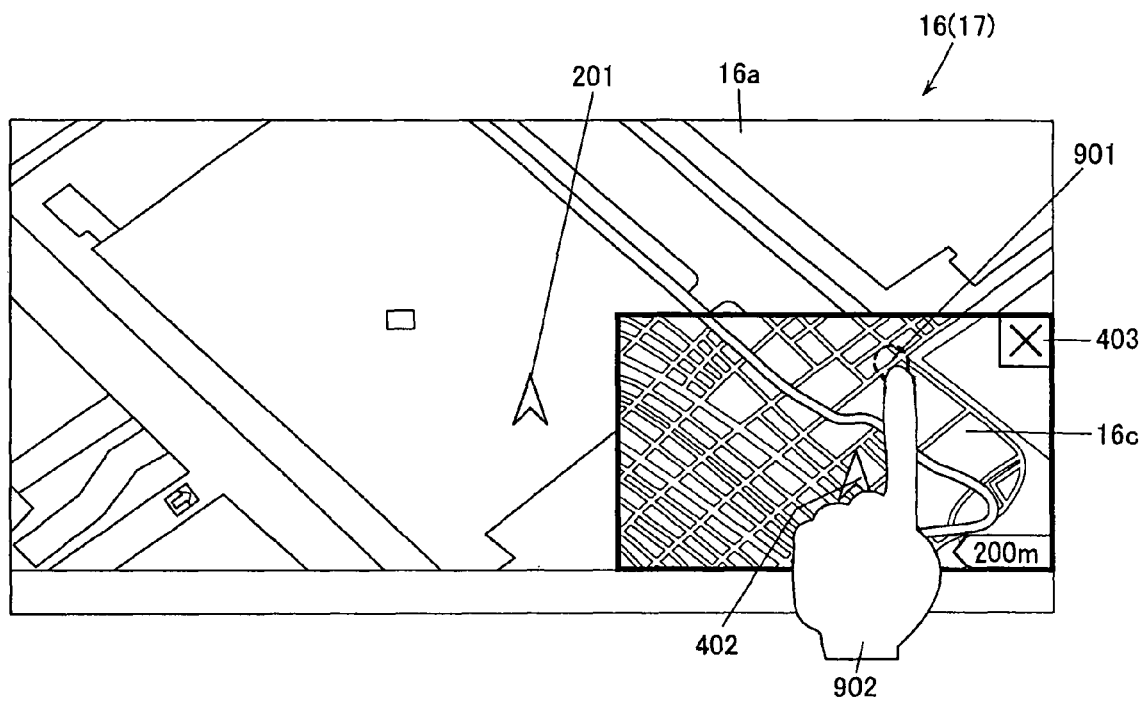
FIG. 9 shows the user's finger pressing down on the wide area map.
Figure 10:
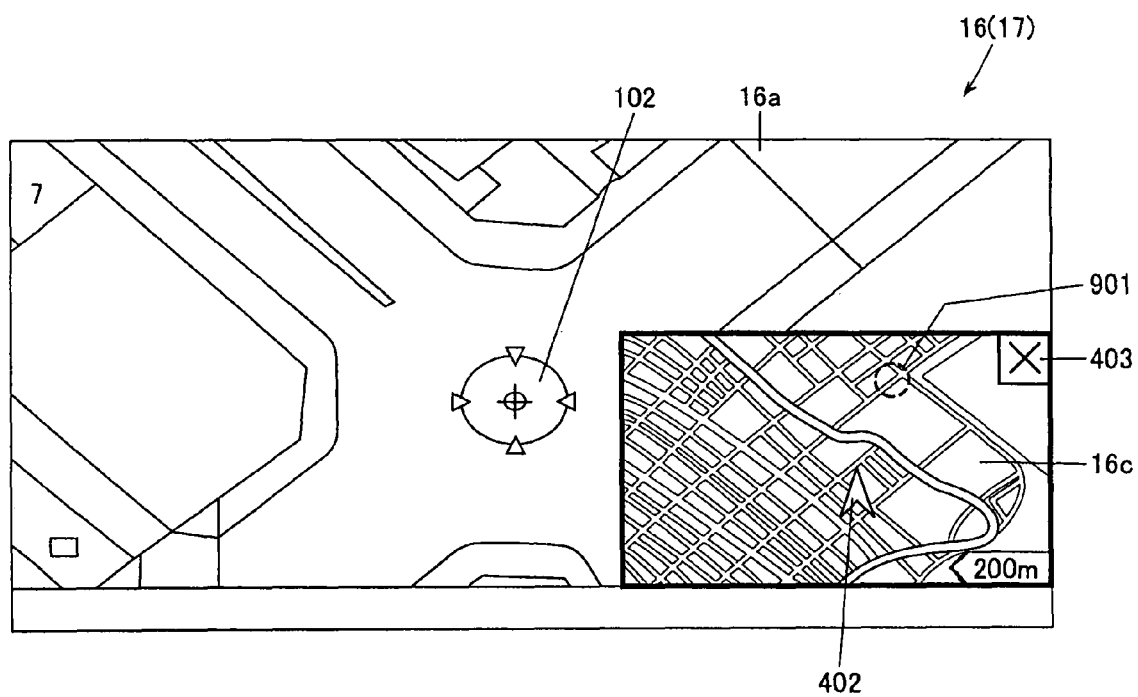
FIG. 10 shows a display screen brought up at the navigation system, which contains a map of an area around a position depressed in the wide area map.

An explanation is now given in reference to FIGS. 9 and 10. FIG. 9 shows a finger 902 of the user depressing the wide-area map in the split screen area 16c at a position 901 away from the subject vehicle position 402. The position 901 is not contained in the range of the main map currently on display in the map display area 16a.

As the finger 902 depresses the wide-area map at the position 901, a map of an area around the position 901 having been depressed on the wide-area map inside the split screen area 16c is brought up on display in the map display area 16a, as shown in FIG. 10. The scaling factor of the map around the depressed position thus brought up is the same as the scaling factor of the main map having been on display in the map display area 16a prior to the depression on the wide area map. The position 901 having been specified in the wide-area map is indicated as a specified point 102 in the map of the surrounding area now on display in the map display area 16a.

The user is thus able to bring up the map of an area around the position 901 away from the subject vehicle position 201 in the map display area 16a.

If the user wishes to bring back the display of the map indicating the subject vehicle position 201 in the map display area 16a, he only needs to depress the subject vehicle position 402 indicated in the wide-area map to promptly display the map of the area around the subject vehicle position 201 in the map display area 16a. In addition, if he wishes to display a map of an area around another position away from the subject vehicle position 201 in the map display area 16a, he only needs to depress another position on the wide area map. Namely, a map of an area around any point present within the range of the wide-area map displayed in the split screen area 16c can be brought up on display in the map display area 16a with ease.

Next, the process through which the map of an area around the depressed position in the wide-area map displayed in the split screen area 16c is brought up on display in the map display area 16a is explained.

As a point on the wide-area map is depressed, a position signal is output from the touch panel control unit 18 to the control circuit 11. Based upon the position signal, the specific position on the wide-area map having been depressed is determined through calculation and the coordinates of the central point of the map to be displayed in the map display area 16a are determined accordingly. A map screen is then generated by using the map data stored in the DVD-ROM 21 so as to set the point corresponding to the central coordinates at the center of the map to be displayed in the map display area 16a and thus, the map of an area around the position 901 having been depressed on the wide-area map is displayed in the map display area 16a.

The navigation system in the other embodiment of the present invention described above achieves the following advantages.

(1) The user is able to display a map of an area around a point that is not contained in the current main map in the map display area 16a, simply by depressing a position on the wide-area map displayed in the split screen area 16c, without having to scroll the main map. As a result, the user is able to promptly display a geographical point not included in the main map currently displayed in the map display area 16a, and consequently, better convenience for the user is assured.

(2) After bringing up a map of an area around a point away from the subject vehicle position 402 in the map display area 16a, the user is able to promptly bring back the display of the main map around the subject vehicle position 201 into the map display area 16a simply by pressing down the subject vehicle position 402 on the wide area map. As a result, the user is able to temporarily and quickly view the map of an area around a geographical point away from the subject vehicle position 402 while the main map of an area around the subject vehicle 201 is on display, and better convenience for the user is afforded.

While an explanation is given above in reference to the embodiments on an example in which the wide-area map is brought up on display as the finger having depressed one of the scale buttons 203 through 215 is moved or dragged over to the map display area 16a and the finger is then lifted from the map display area 16a, the wide-area map may instead be brought up on display as the finger having depressed the scale button is simply moved or dragged over to the map display area 16a.

While the wide-area map 401 is brought up as a semitransparent display in the map split display area 16c in the embodiments described above, the wide-area map does not need to be brought up as a semitransparent display. In addition, while the wide-area map is displayed in the lower right corner within the map display area 16a, it may be displayed at a position other than the lower right corner.

While an explanation is given above in reference to the embodiments on an example in which as one of the scale buttons 203 through 215 is held down with a finger over the predetermined length of time or longer, it is judged that the scale button has been selected and the map is brought up on display at the map scaling factor corresponding to the selected scale button. However, a specific scale button may instead be selected by depressing one of the scale buttons 203 through 215 twice or more in succession within a predetermined length of time.

While an explanation is given above in reference to the embodiments on an example in which the navigation system 1 is installed in a vehicle, the present invention is not limited to this example. The present invention may be adopted in a portable navigation system that can be carried around. In addition, it may be adopted in a portable telephone equipped with a navigation function. Moreover, the present invention is not limited to applications in navigation systems and may be adopted in all types of map display apparatuses that display maps.

In addition, the control program executed in the navigation system 1 described above may be installed in a personal computer to enable the personal computer to function as a navigation apparatus. In such a case, the control program for the navigation apparatus may be provided in a recording medium such as a DVD or a CD-ROM or through a data signal on the Internet or the like. Thus, the control program for achieving a navigation system with the features described above may be distributed as a computer-readable computer program product adopting any of various modes including a recording medium and a carrier wave.

The above described embodiments are examples and various modifications can be made without departing from the spirit and scope of the invention.

What is claimed is:

1. A map display apparatus that displays a map, comprising:
    a display device;
    a touch panel disposed over a screen at the display device; and
    a control device that controls display at the display device with a signal input from the touch panel, wherein:
    the control device displays at the display device a map and a plurality of buttons respectively designating a plurality of scaling factors that have smaller values than a scaling factor of the map and correspond to wider-area maps than the map, makes a decision as to whether or not the touch panel has been pressed at a position corresponding to one of the plurality of buttons, makes a decision as to whether or not a finger having pressed the touch panel at the position corresponding to one of the plurality of buttons respectively designating the plurality of scaling factors has been moved to a display position of the map while pressing the touch panel, and displays a wide-area map at a scaling factor designated to the one of the plurality of buttons pressed by the finger, over a part of an area where the map is displayed while sustaining the scaling factor of the map unchanged if the finger having pressed the touch panel is judged to have been moved to the display position of the map.

2. A map display apparatus according to claim 1, wherein:
    the control device displays the plurality of buttons on either side of an area where the map is displayed.

3. A map display apparatus according to claim 1, wherein:
    the control device brings up the wide-area map as a semi-transparent display.

4. A map display apparatus according to claim 1, wherein:
    the control device displays the plurality of buttons over two rows running along one side of an area where the map is displayed; and
    upon deciding that a position at the touch panel corresponding to a button disposed in an outer row has been pressed, the control device invalidates a signal generated in response to pressing a position at the touch panel corresponding to, at least, a button disposed in an inner row.

5. A map display apparatus according to claim 1, wherein:
    upon deciding that a position at the touch panel corresponding to a given point in the wide-area map has been pressed, the control device switches the displayed map to a map of an area around the point on the wide-area map having been pressed without altering the scaling factor.

6. A navigation system comprising:
    a map display apparatus according to claim 1.

7. A map display apparatus that displays a map, comprising:
    a display device;
    a touch panel disposed over a screen at the display device; and
    a control device that controls display at the display device with a signal input from the touch panel, wherein:
    the control device displays at the display device a map and a plurality of buttons respectively designating a plurality of scaling factors that have smaller values than a scaling factor of the map and correspond to wider-area maps than the map, makes a decision as to whether or not the touch panel has been pressed at a position corresponding to one of the plurality of buttons, makes a decision as to whether or not the one of the buttons has been pressed over a predetermined length of time or longer or twice or more in succession, and whether or not a finger having pressed the touch panel at the position corresponding to one of the plurality of buttons respectively designating the plurality of scaling factors has been moved to a display position of the map while pressing the touch panel, displays the map by adjusting the scaling factor of the map to the scaling factor designated to the pressed button upon deciding that the one of the buttons has been pressed over the predetermined length of time or longer or twice or more in succession, and displays a wide-area map at a scaling factor designated to the one of the plurality of buttons pressed by the finger, over a part of an area where the map is displayed while sustaining the scaling factor of the map unchanged upon deciding that the finger having pressed the touch panel has been moved to the display position of the map.

8. A map display method for displaying a map at a display device that includes a touch panel disposed over a screen thereof, comprising:
    displaying a map and a plurality of buttons respectively designating a plurality of scaling factors that have smaller values than a scaling factor of the map and correspond to wider-area maps than the map;
    making a decision as to whether or not a position on the touch panel corresponding to one of the plurality of buttons has been pressed and a finger having pressed the position on the touch panel has been moved to a display position of the map while pressing the touch panel; and
    displaying a wide-area map at a scaling factor smaller than a scaling factor designated to the one of the plurality of buttons pressed by the finger, over a part of an area where the map is displayed while sustaining the scaling factor of the map unchanged upon deciding that the finger having pressed the position on the touch panel has been moved to the display position of the map.

* * * * *